United States Patent [19]

Inoue et al.

[11] Patent Number: 5,535,080
[45] Date of Patent: Jul. 9, 1996

[54] MAGNETIC HEAD CONNECTING STRUCTURE HAVING TEMPORARILY RETAINING PAWLS

[75] Inventors: Naoto Inoue; Kiyotaka Yamaguchi, both of Yamagata, Japan

[73] Assignee: Mitsumi Electric Co., Ltd., Tokyo, Japan

[21] Appl. No.: 361,563

[22] Filed: Dec. 22, 1994

[30] Foreign Application Priority Data

Dec. 25, 1993 [JP] Japan ................. 5-073917 U

[51] Int. Cl.⁶ .................................................. G11B 5/10
[52] U.S. Cl. .................. 360/129; 360/104; 360/108; 439/607
[58] Field of Search .................... 360/104–106, 360/108, 128, 129; 439/607–610

[56] References Cited

U.S. PATENT DOCUMENTS

| | | | |
|---|---|---|---|
| 4,546,541 | 10/1985 | Reid | 360/129 |
| 4,669,012 | 5/1987 | Tomita | 360/105 |
| 4,672,492 | 6/1987 | Muramatsu | 360/109 |
| 4,879,620 | 11/1989 | Yamashita | 360/104 |
| 4,938,714 | 7/1990 | Kawai et al. | 439/607 |
| 5,030,140 | 7/1991 | Sugiyama | 439/607 |
| 5,091,811 | 2/1992 | Chang | 360/104 |
| 5,161,999 | 11/1992 | Broschard, III et al. | 439/607 |

FOREIGN PATENT DOCUMENTS

| | | | |
|---|---|---|---|
| 1103470 | 11/1955 | France | 360/129 |
| 58-17513 | 2/1993 | Japan | 360/129 |
| 2157051 | 10/1985 | United Kingdom | 360/128 |

*Primary Examiner*—Stuart S. Levy
*Assistant Examiner*—Jefferson Evans
*Attorney, Agent, or Firm*—Whitham, Curtis, Whitham & McGinn

[57] ABSTRACT

A magnetic head connecting structure includes a back of a magnetic head held by a tape guide covered with a backshield made of a metal strip and a flexible board soldered to lead terminals of the magnetic head which project from openings of the backshield. In such a magnetic head, a pair of temporarily retaining pawls projecting toward the tape guide are integrally molded on both sides of the backshield, and the temporarily retaining pawls are inserted and temporarily retained in corresponding fixing holes formed in a back of the tape guide.

18 Claims, 1 Drawing Sheet

MAGNETIC HEAD CONNECTING STRUCTURE HAVING TEMPORARILY RETAINING PAWLS

BACKGROUND OF THE INVENTION

1. Field of the Invention

The device relates to magnetic heads adapted for use with audio tapes, and more particularly to a structure for connecting a flexible board to the lead terminals of a magnetic head.

As is well known, a magnetic head for audio tapes is assembled to a tape deck while held by a resin-molded tape guide, and a flexible board is connected to the magnetic head while soldered to lead terminals on the back of the magnetic head. In order to prevent external magnetic fields from affecting the inside of the magnetic head, the back of the magnetic head is, in some cases, covered with a backshield made of a metal strip.

That is, FIG. 2 shows such a conventional magnetic head connecting structure. A magnetic head 1A is held by a resin-molded tape guide 2A. A back 1a of the magnetic head 1A is covered with a backshield 4A that has a pair of openings 3L, 3R formed therein, the openings allowing a plurality of lead terminals 1b to pass therethrough.

The tips of these lead terminals 1b projected from the openings 3L, 3R are inserted into corresponding connecting holes 6A in a flexible board 5A and soldered to a lead pattern on the flexible board 5A for connection to an external circuit.

Therefore, in the thus constructed conventional magnetic head connecting structure, the following connecting procedure is taken. In order to prevent the backshield 4A from coming in contact with the lead terminals 1b of the magnetic head 1A, the backshield 4A is bonded to the surface of the flexible board 5A using a pressure sensitive adhesive double coated tape 7, and then the lead terminals 1b of the magnetic head 1A are soldered while inserted into the connecting holes 6A of the flexible board 5A before the backshield 4 is assembled to the magnetic head 1A.

However, when the flexible board 5A is connected to the magnetic head 1A according to the aforementioned procedure, it is required that the backshield 4A be manually positioned with accuracy on the surface of the flexible board 5A so that the backshield 4A will not come in contact with the lead terminals 1b of the magnetic head 1A before the backshield 4A is fixed to the surface of the flexible board 5A using the pressure sensitive adhesive double coated tape 7. This makes the connecting process laborious, thus limiting the productivity.

The device has been made in consideration of the aforementioned problem addressed by the conventional magnetic head connecting structure. Accordingly, the object of the device is to provide a magnetic head connecting structure capable of reliably preventing contact between the backshield and the lead terminals without requiring an accurate positioning operation.

SUMMARY OF THE INVENTION

To achieve the object, the device proposes a magnetic head connecting structure in which the back of a magnetic head held by a tape guide is covered with a backshield made of a metal strip and a flexible board is soldered to lead terminals of the magnetic head projected from openings of the backshield. In such magnetic head connecting structure, a pair of temporarily retaining pawls projecting toward the tape guide are integrally molded on both sides of the backshield, and the temporarily retaining pawls are inserted and temporarily retained in corresponding fixing holes formed in the back of the tape guide.

According to the present invention, the device is provided to allow the lead terminals of the magnetic head to be positioned with respect to the backshield only by molding a pair of temporarily retaining pawls on the backshield and temporarily retaining these temporarily retaining pawls in the corresponding fixing holds of the tape guide. Therefore, the device provides the advantage of simplifying the connecting process without elevating the cost of manufacture.

DETAILED DESCRIPTION OF THE PREFERRED EMBODIMENTS

An embodiment of the device will now be described with reference to FIG. 1.

Figure 1:
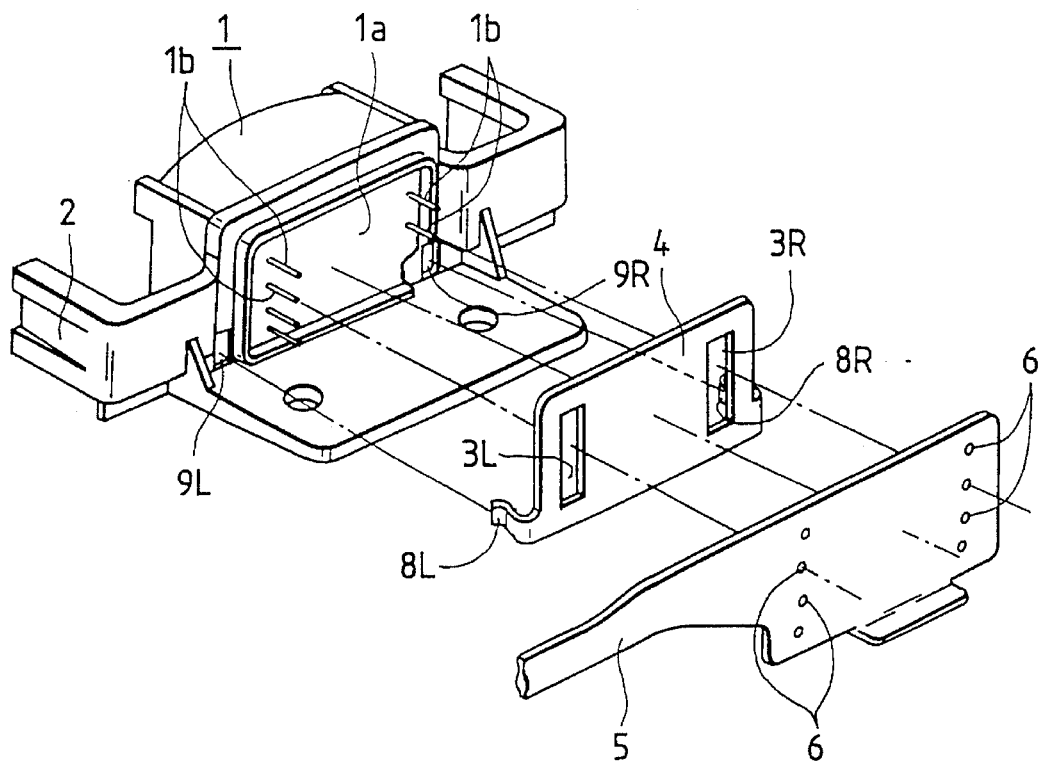
FIG. 1 is an exploded perspective view of a magnetic head connecting structure of the device.
Figure 2:
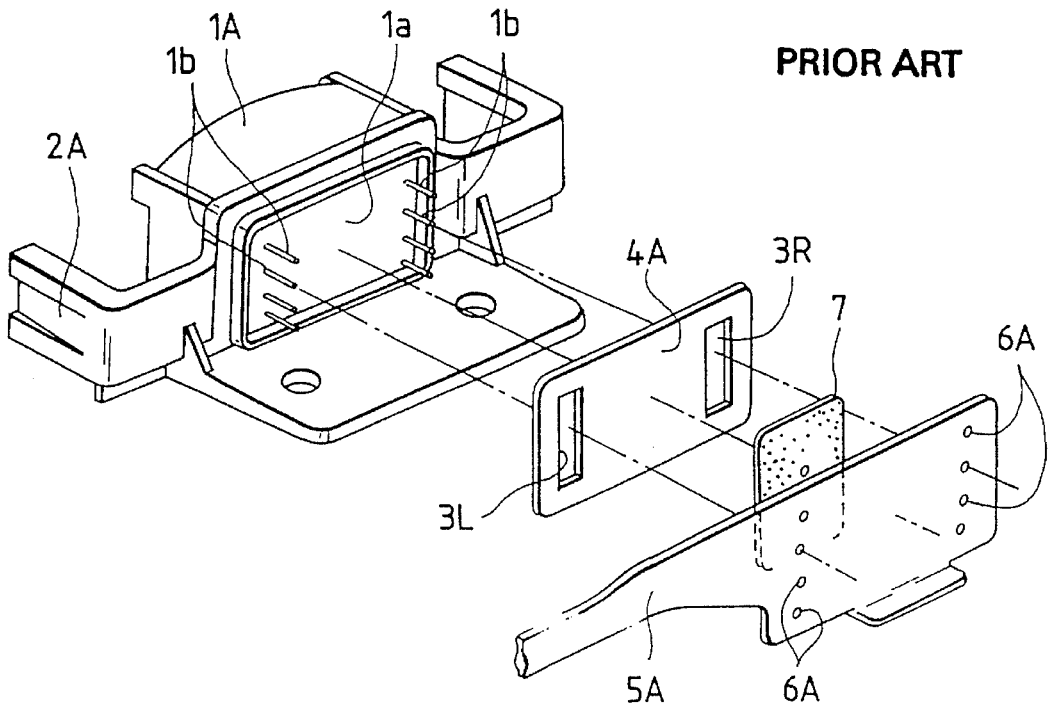
FIG. 2 is an exploded perspective view of a conventional magnetic head connecting structure.

In FIG. 1 the back 1a of a magnetic head 1 held by a resin-molded tape guide 2 is covered with a backshield 4 having a pair of openings 3L, 3R allowing a plurality of lead terminals 1b to pass therethrough. The tips of these lead terminals 1b are inserted into corresponding connecting holes 6 in a flexible board 5 and soldered to a lead pattern on the flexible board 5 for connection to an external circuit. The construction of a magnetic head connecting structure of the invention is the same as that of the conventional example up to this point.

The feature of the embodiment shown in the drawing resides in the introduction of a pair of temporarily retaining pawls 8L, 8R, which are formed by bending at right angles so as to project from both sides at the bottom of the backshield 4 that is formed by blanking a metal strip. That is, these temporarily retaining pawls 8L 8R are projected toward the back 2a of the tape guide 2. A pair of small fixing holes 9L, 9R for receiving the tips of the temporarily retaining pawls 8L, 8R are formed in the back 2a of the tape guide 2.

With the magnetic head connecting structure according to the embodiment shown in FIG. 1 being constructed as described above, when the backshield 4 is pushed onto the back 1a of the magnetic head 1 to allow the temporarily retaining pawls 8L, 8R to be inserted into and thus retained in the fixing holes 9L, 9R of the tape guide 2 before the flexible board 5 is connected to the lead terminals 1b of the magnetic head 1, the openings 3L, 3R in the backshield 4 come to be aligned with the lead terminals 1b, and this in turn causes the backshield 4 to be fixed to the back 2a of the tape guide 2, allowing the backshield 4 to be out of contact with the lead terminals 1b.

Therefore, the magnetic head 1 can be connected to the flexible board 5 only by fitting the connecting holes 6 of the flexible board 5 with the tips of the lead terminals 1b projecting from the openings 3L, 3R of the backshield 4, and then soldering the lead terminals 1b to the flexible board 5.

As is apparent from the foregoing, the device is provided as allowing the lead terminals of the magnetic head to be positioned with respect to the backshield only by molding a pair of temporarily retaining pawls on the backshield and temporarily retaining these temporarily retaining pawls in the corresponding fixing holds of the tape guide. Therefore, the device provides the advantage of simplifying the connecting process without elevating the cost of manufacture.

What is claimed is:

1. A magnetic head connecting structure comprising:

a tape guide having fixing holes formed in a back of said tape guide;

a magnetic head held by said tape guide;

a backshield covering a back of the magnetic head and comprising a metal strip and including openings;

a flexible board soldered to lead terminals of the magnetic head which project through said openings of the backshield; and a pair of temporarily retaining pawls projecting toward the tape guide, which are arranged on the backshield, the temporarily retaining pawls being inserted and temporarily retained in corresponding ones of said fixing holes formed in a back of the tape guide, wherein said temporarily retaining pawls are positioned at right angles to said backshield and are integrally formed with said backshield.

2. A magnetic head connecting structure as claimed in claim 1, wherein the temporarily retaining pawls are integrally formed on first and second sides of the backshield.

3. A magnetic head connecting structure as claimed in claim 1, wherein said temporarily retaining pawls each comprise a metal.

4. A magnetic head connecting structure as claimed in claim 1, wherein said temporarily retaining pawls each have a curved shape for retaining said temporarily retaining pawls in said fixing holes.

5. A magnetic head connecting structure as claimed in claim 1, wherein said temporarily retaining pawls are for preventing said backshield from contacting said lead terminals.

6. A magnetic head connecting structure as claimed in claim 1, wherein said backshield includes a lower portion and said temporarily retaining pawls are positioned on said lower portion of said backshield.

7. A magnetic head connecting structure as claimed in claim 1, wherein said backshield comprises a metal strip having been blanked.

8. A structure for use with a recording head comprising:

a tape guide having a guide back side, said guide back side having a lower portion, said lower portion having guide openings, said recording head being connected to said tape guide and said recording head having a head back side and lead terminals projecting from said head back side; and a backshield connected to said tape guide, said backshield including backshield openings through which said lead terminals project and temporarily retaining pawls for projecting into said guide openings, wherein said pawls are positioned at right angles to said backshield and are integrally formed with said backshield.

9. A structure as in claim 8, wherein said pawls comprise a flexible material.

10. A structure as in claim 9, wherein said flexible material comprises metal.

11. A structure as in claim 8, wherein said pawls have a curvature such that said pawls retain said backshield in said guide openings.

12. A structure as in claim 8, wherein said pawls are for aligning said backshield openings such that said lead terminals project through said backshield openings and said lead terminals are kept from contacting said backshield.

13. A structure as in claim 8, wherein said backshield includes a lower portion and said pawls are positioned on said lower portion of said backshield.

14. A structure as in claim 8, wherein said backshield comprises a metal strip having been blanked.

15. A structure as in claim 8, wherein said guide openings comprise first and second openings spaced a predetermined distance apart.

16. A structure as in claim 8, wherein said pawls comprise a flexible material, said pawls each having a curvature such that said pawls retain said backshield in said guide opening and said pawls being for aligning said backshield openings such that said lead terminals project through said backshield openings and said lead terminal are prevented from contacting said backshield, wherein said backshield includes a lower portion and said pawls are positioned on said lower portion of said backshield.

17. A structure as in claim 16, wherein said backshield comprises a metal strip having been blanked and wherein said guide openings comprise first and second openings spaced a predetermined distance apart.

18. A structure as in claim 8, wherein said pawls are for aligning said recording head and said backshield.

* * * * *